(12) United States Patent
Carpenter et al.

(10) Patent No.: US 8,416,260 B1
(45) Date of Patent: Apr. 9, 2013

(54) SIGMA BUFFER FOR RENDERING SMALL OBJECTS

(75) Inventors: Loren Carpenter, Nicasio, CA (US); Dana Batali, Bainbridge Island, WA (US); Julian Fong, Oakland, CA (US)

(73) Assignee: Pixar, Emeryville, CA (US)

(*) Notice: Subject to any disclaimer, the term of this patent is extended or adjusted under 35 U.S.C. 154(b) by 1357 days.

(21) Appl. No.: 12/125,346

(22) Filed: May 22, 2008

Related U.S. Application Data

(60) Provisional application No. 60/940,381, filed on May 25, 2007.

(51) Int. Cl.
*G09G 5/00* (2006.01)

(52) U.S. Cl. .................. 345/619; 345/423; 345/424

(58) Field of Classification Search .................. None
See application file for complete search history.

(56) References Cited

U.S. PATENT DOCUMENTS

| | | | | |
|---|---|---|---|---|
| 4,520,671 A | * | 6/1985 | Hardin | 73/620 |
| 5,651,104 A | * | 7/1997 | Cosman | 345/428 |
| 6,400,370 B1 | * | 6/2002 | Lee et al. | 345/586 |
| 6,525,723 B1 | * | 2/2003 | Deering | 345/419 |
| 6,614,447 B1 | * | 9/2003 | Bhatia et al. | 345/592 |
| 7,474,308 B2 | * | 1/2009 | Deering | 345/419 |

* cited by examiner

*Primary Examiner* — James A Thompson
*Assistant Examiner* — David H Chu
(74) *Attorney, Agent, or Firm* — Kilpatrick Townsend & Stockton LLP

(57) ABSTRACT

Small objects causing aliasing are enlarged so that they are likely to be sampled by image sampling points. The opacity of the enlarged object is reduced in proportion to the enlargement. To efficiently render partially transparent objects, such as enlarged objects, objects are sampled using sigma buffer samples instead of image sample points. For each sigma buffer sample, a corresponding portion of the object is set to either completely transparent or completely opaque. The proportion of transparent to opaque portions of the object matches or approximates the partial transparency of the object as a whole. The completely opaque portions of one or more objects are sampled with the corresponding sigma buffer samples. Aggregate values of the sigma buffer samples are determined and can be combined with the attribute values of other objects sampled with image sampling points associated with the same region as the set of sigma buffer samples.

41 Claims, 7 Drawing Sheets

SIGMA BUFFER FOR RENDERING SMALL OBJECTS

CROSS-REFERENCE TO RELATED APPLICATIONS

This application claims priority to U.S. Provisional Patent Application No. 60/940,381, filed May 25, 2007, which is incorporated by reference herein for all purposes.

BACKGROUND

The present invention relates to the field of computer graphics, and in particular to methods and apparatus for optimizing the evaluation of functions associated with surfaces. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Rendering typically divides an image into image sample points, which corresponding with pixels or sub pixel regions of the image. The renderer samples the lighting and shading of objects or geometry of a scene for each image sample point to create an image. Renderers typically sample scenes by projecting rays from image sample points into the scene to intersect scene geometry or by projecting scene geometry on to the image plane and determining intersections between image sample points and projected scene geometry.

Because the scene is sampled at discrete locations with image sample points, aliasing artifacts can arise when rendering small objects. Small objects are objects or scene geometry that are relatively small (e.g. less than one pixel in size) when projected on to the image plane, which can be because the scene geometry itself is relatively small and/or because the scene geometry is far away from the camera viewpoint. Small objects can be any type of scene geometry, such as polygons, micropolygons, particles, curves, patches, or any other computer graphics representation of geometry known in the art.

Temporal aliasing is one problem with rendering small objects. Typical renderers sample the scene geometry at one or more discrete image sample points within the boundaries of each pixel. If an image sample point "hits" scene geometry, the attributes of the scene geometry, such as its color, are used to determine the attribute values of the image sample point. Relatively large objects, which are larger than the spacing between image sample points, will always be hit by at least one image sample point as the object moves relative to the camera viewpoint. However, small objects may be smaller than the typical spacing between image sample points when projected on to the image plane. As a result, small objects tend to sporadically fall between image sample points as they move relative to the camera viewpoint, causing flickering or temporal aliasing.

One prior solution to this problem is to increase the number and density of images samples in a pixel. However, this greatly increases the computational resources and time needed to render an image. Additionally, regardless of the number and density of image sample points, there is no way to completely eliminate temporal aliasing.

It is therefore desirable for a system and method to eliminate temporal aliasing arising from the rendering of small objects. It is further desirable for the system and method to efficiently render large numbers of small objects. It is also desirable for the system and method to efficiently render large numbers of transparent objects.

BRIEF DESCRIPTION OF THE DRAWINGS

The invention will be described with reference to the drawings, in which.

BRIEF SUMMARY

An embodiment of the invention renders small objects potentially capable of temporal aliasing by enlarging the small object so that it is likely to always be sampled by at least one image sampling point at the renderer's image sampling rate. The opacity value of the enlarged object is reduced in proportion to the amount of enlargement, so that the enlarged object makes the same overall contribution to the image as the original version of the object.

To efficiently render one or more partially transparent objects, such as the enlarged objects, an embodiment samples partially transparent objects using sigma buffer sample points, rather than the image sample points. Sigma buffer sample points use window-screen transparency, in which portions of an object are considered either as completely transparent or completely opaque. For each sigma buffer sample, an embodiment of the invention sets the corresponding portion of the object to either completely transparent or completely opaque. The proportion of transparent to opaque portions of the object matches or approximates the partial opacity or transparency of the object as a whole. An embodiment of the invention then samples the object with the sigma buffer samples corresponding with the completely opaque portions of the object.

An embodiment of the invention may sample multiple partially transparent objects using the same set of sigma buffer samples. After the sigma buffer sampling is completed, an embodiment of the invention determines one or more aggregate values of the set of sigma buffer samples representing the average color, depth, and/or other attributes of the set of sigma buffer samples. The aggregate values of the set of sigma buffer samples can be combined or composited with the values of other objects sampled with image sampling points associated with the same region as the set of sigma buffer samples.

DETAILED DESCRIPTION

Figure 1:
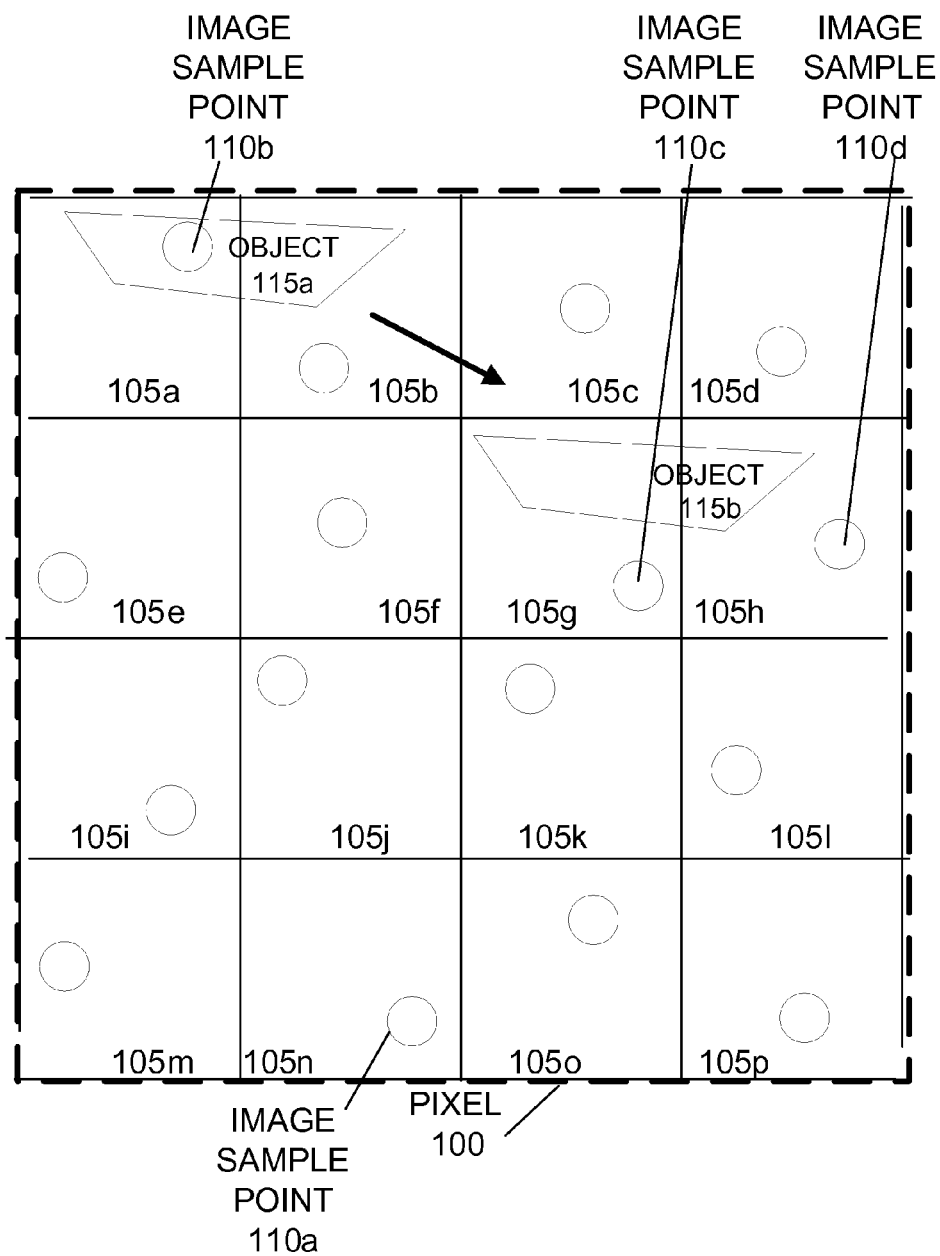
FIG. 1 illustrates an example of temporal aliasing during the rendering of a small object.

FIG. 1 illustrates the problem of temporal aliasing in rendering small objects. In FIG. 1, an example pixel 100 is divided into sample regions 105. The sample regions 105 include image sample points 110. Image sample points 110 can be distributed according to a pattern, randomly, or pseudo-randomly within the pixel. In an embodiment, an image sampling rate specifies the approximate spacing within the distribution of image sample points within a pixel. An object, such as a particle, polygon, fragment, micropolygon, or any other renderable entity, may be classified as "large" or "small" relative to the image sampling rate. A small object is any object that may exhibit temporal aliasing because it can fall between image sample points and thus temporarily disappear from an animated sequence.

As can be seen in FIG. 1, a small object in a first position 115a intersects image sample point 110b in sample region 105a. When the small object moves to a second position 115b, it falls between the image sample points 110d and 110e in sample regions 105g and 105h, respectively. Because small objects may be completely missed by image sample points depending upon their position, small objects will flicker in and out of the image as they moves and falls in between image sample points.

Figure 2:
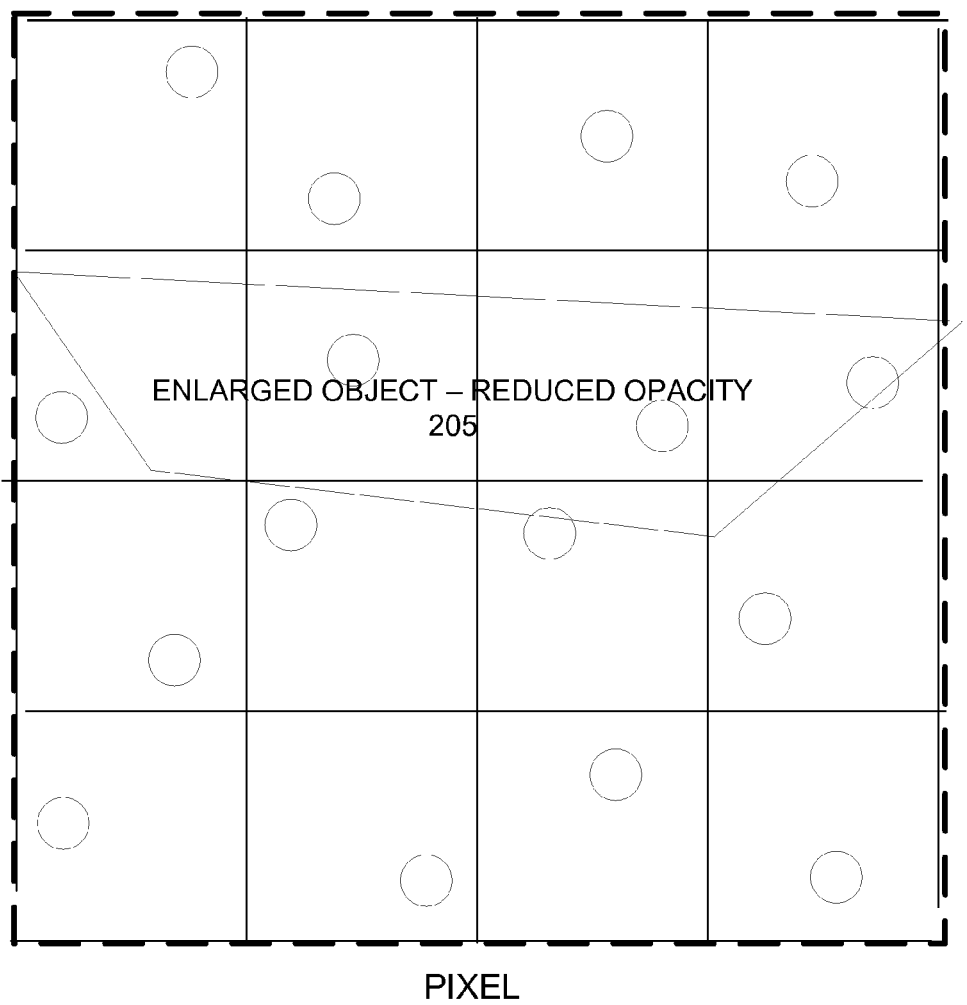
FIG. 2 illustrates an example solution to eliminate temporal aliasing of small objects according to an embodiment of the invention.

FIG. 2 illustrates an example solution 200 to eliminate temporal aliasing of small objects according to an embodiment of the invention. Rather than increase the number of image sample points in a pixel to reduce temporal aliasing, this embodiment of the invention increases the size of small objects so that the probability of the small object intersecting an image sample point at any position is increased. For example, if the object 115 in FIG. 1 is enlarged to approximately the size of a pixel, as shown in FIG. 2, the enlarged object 205 will intersect at least one image sample point regardless of its position.

However, increasing the size of a small object will disproportionately increase its contribution to the image. To compensate, this embodiment modifies the transparency of the enlarged object 205 so that the integral or sum of the image contribution of the enlarged object over the area of the pixel is the same as that of the original object. In an embodiment, the transparency of the object is scaled inversely proportional to change in object size. For example, if the enlarged object 205 is four times larger than the original object, the enlarged object 205 will have one quarter the opacity of the original object 115. In this example, an opaque original object 115 will correspond with an enlarged object 205 with 25% opacity.

This embodiment of the invention eliminates temporal aliasing from rendering small objects. However, because this embodiment greatly increases the number of transparent objects, it can also dramatically increases the time and computational resources required for rendering. Transparent objects typically require additional processing as compared with opaque objects. A renderer can processor opaque objects intersecting an image sample point with a simple depth comparison test. If the object under consideration has a depth value at the image sample point location behind the depth value previously stored for the image sample point, the object is not visible and can be discarded. Otherwise, the color value and depth value of the image sample point are replaced with that of the object under consideration. The object is then removed from further consideration.

In contrast, a transparent object intersecting an image sample point must be composited or alpha blended with all of the other objects intersecting the image sample point. Each compositing operation requires at least several multiplications. If there are a large number of small objects potentially intersecting an image sample point, for example when rendering a distant forest or small hairs on a character model, this embodiment may add hundreds or thousands of computationally expensive compositing operations to the processing required for each image sample point.

Additionally, compositing operations typically must be performed in depth order, either front-to-back order or back-to-front order, to accumulate the composite color and transparency or opacity of the image sample point due to all of the objects intersecting the image sample point. Thus, the renderer is required to process and store all of the objects intersecting an image sample point (and at least their attributes of color and depth) before performing any compositing operations for the image sample point. This greatly increases the amount of memory required to render scenes.

An embodiment of the invention eliminates temporal aliasing of small objects without substantially increasing the required amount of computational resources. This embodiment improves rendering efficiency by eliminating the computationally expensive compositing operations required for rendering enlarged, partially transparent versions of small objects. This embodiment uses a data structure referred to as a sigma buffer to determine the contribution of transparent objects to image sample points without computationally expensive compositing operations.

An embodiment of the invention uses "window-screen" transparency to render and composite small objects. Window-screen transparency partitions objects into a number of small portions. Each portion is either completely opaque or completely transparent. The ratio of opaque to transparent portions is based on the transparency value of the object. The distribution of opaque and transparent portions within the bounds of an object may be based on a pattern or determined randomly or pseudo-randomly. Opaque portions of the object are depth tested against previously rendered objects and added to an image sample point only if they are in front of previously rendered objects. Opaque portions of the object behind previously rendered objects and all transparent portions of the object are discarded.

Figure 3:
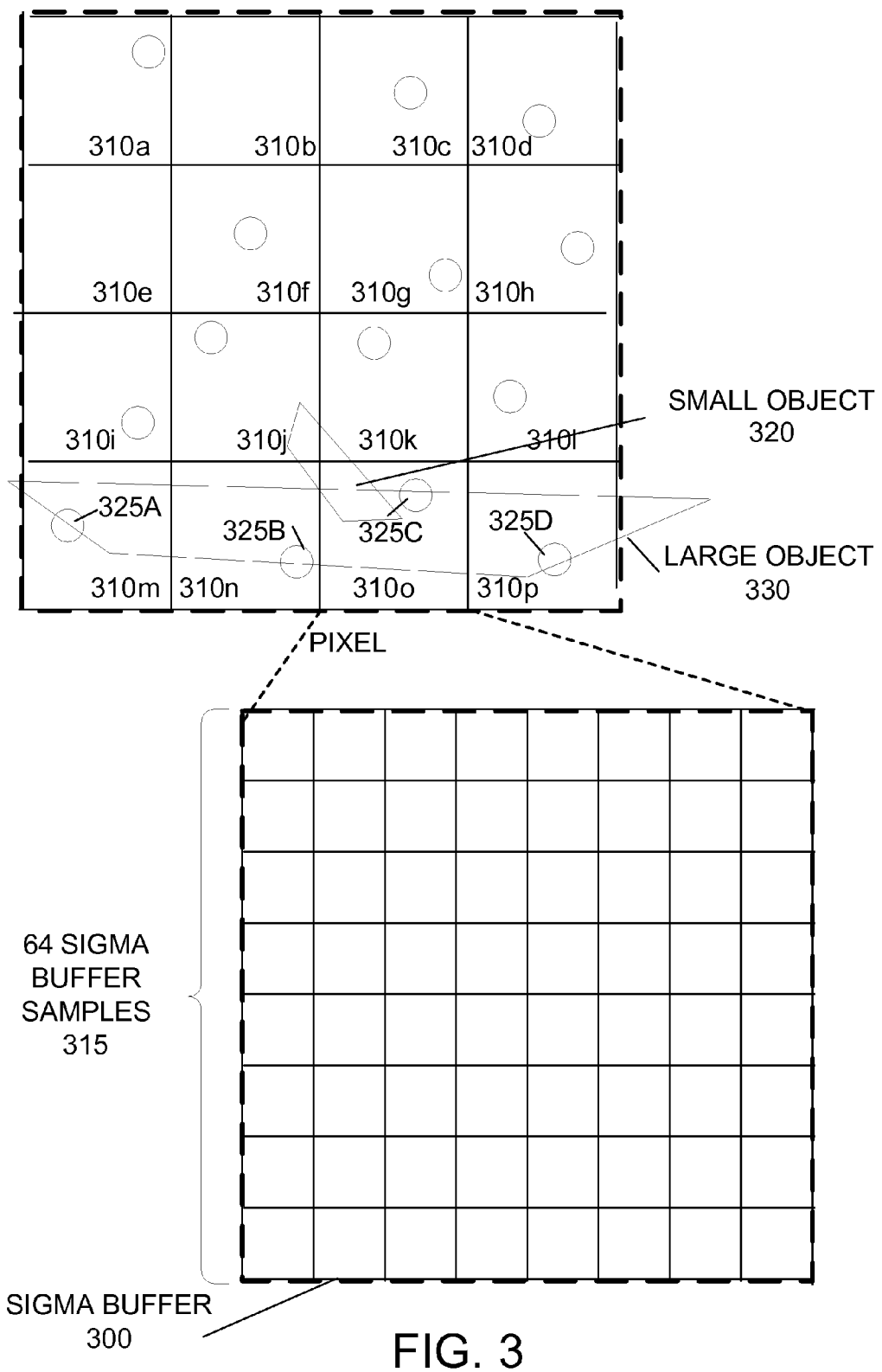
FIG. 3 illustrates a sigma buffer for eliminating temporal aliasing of small objects according to an embodiment of the invention.

FIG. 3 illustrates a sigma buffer 300 for eliminating temporal aliasing of small objects according to an embodiment of the invention. A sigma buffer partitions a sample region associated with a subpixel sample into a large number of sub-samples. In this example, a pixel 305 is divided into 16 sub-pixel regions 310a-310p. The sigma buffer 300 associated with one of the image sample point regions 310a. In this example, the sigma buffer 310 includes 64 sigma buffer samples 315. Each of the sigma buffer samples is adapted to store at least a color and a depth value associated with a rendered object. In further embodiments, each of the sigma buffer samples may be adapted to store any other attribute or property of objects or scene geometry used to render an image.

When rendering normal (e.g. "large") objects, which are objects with geometry larger than the image sampling rate when projected on to the image place, each of the sub-pixel regions 310 includes one or more discrete image sample points for rendering objects, similar to FIG. 1. For example, object 330 is approximately the size of a pixel and is rendered by sampling the object 330 with image sample points 325a-325d.

However, if small objects that tend to introduce temporal aliasing intersect an image sample point region, an embodiment of the renderer initializes a sigma buffer data structure for the sample region. For example, if a small object 320 intersects sample region 310o, an embodiment of the renderer initializes sigma buffer data structure 300. An embodiment of the renderer uses the sigma buffer data structure 300 to render one or typically many small objects intersecting the sample region 310o. After rendering some or all of the small objects intersecting the sample region 310o, the contents of the sigma buffer 300 are aggregated and combined with any objects' contributions to the image sample point associated with the sample region, such as large object's 330 contribution to image sample point 325c.

Figure 4:
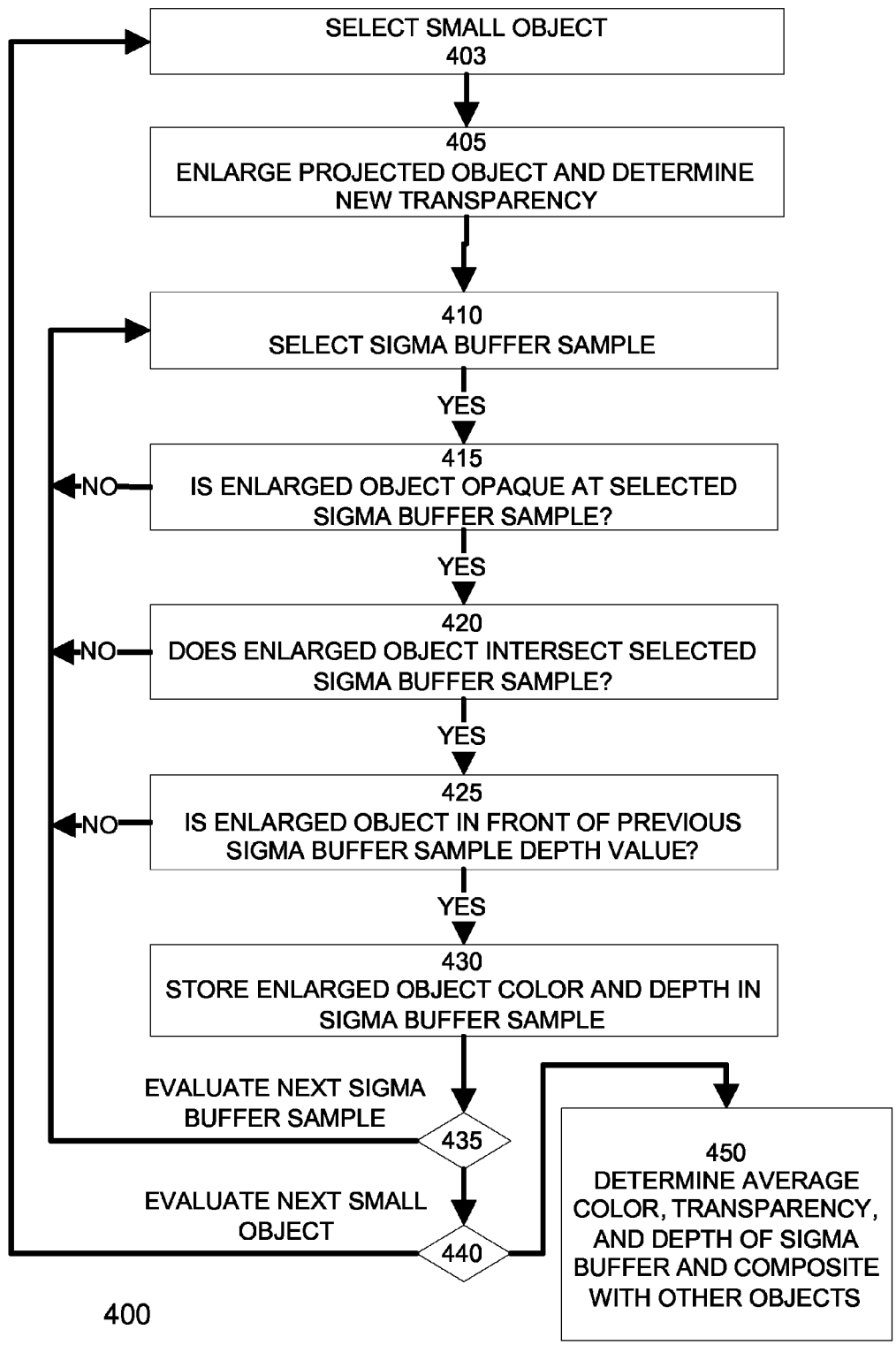
FIG. 4 illustrates a method of rendering small objects using a sigma buffer to eliminate temporal aliasing according to an embodiment of the invention.

FIG. 4 illustrates a method 400 of rendering small objects using a sigma buffer to eliminate temporal aliasing according to an embodiment of the invention. First, step 403 selects a small object that intersects the sample region when projected on to the image plane. Objects can be designated as "small" objects manually by users or automatically based on the size of the object projected into the image plane. For example, any object or other entity to be rendered that is smaller than a pixel or alternatively smaller than a sample region when projected on to the image plane may be automatically designated as small and rendered using a sigma buffer, rather than by sampling with image sample points.

Embodiments of the invention may use other techniques or criteria for classifying objects as small or large relative to the image sampling rate. For example, an embodiment of the invention may compare the size of the object in one or more dimensions with a size threshold value. In another example, an embodiment of the invention may compare the area of an object with an area ratio. In another example, an embodiment of the invention may compare the object or its bounding box with a size criteria, such as the size or one or more dimensions, an aspect ratio, area, or any combination thereof. In still another example, an embodiment of the invention compares the object or its bounding box with the spacing between image sample points within the sample region.

Step 405 enlarges the selected small object to a size sufficient to eliminate temporal aliasing. The size of the enlarged object should ensure that the enlarged object intersects at least one image sample point regardless of its position. This size can be predetermined, such as enlarging objects to the size of a pixel or sample region, or based on the density of image sample points within a pixel, sample region, or other portion of an image.

To ensure that the enlarged object does not make an increased contribution to the image, step 405 scales the transparency or opacity of the enlarged object by a value inversely proportional to the scaling factor used to create the enlarged object. For example, if an object is enlarged by a factor of three, the opacity of the enlarged object is scaled by one third. In this example, if the original object is complete opaque (e.g. opacity=100%), then the opacity of the enlarged object will be 33%. Similarly, if the original object has an opacity of 50%, then the opacity of the enlarged object will be 16.67%.

Step 410 selects a sigma buffer sample within a sigma buffer associated with the image sample region for evaluation. Step 415 determines if the enlarged object is opaque or transparent at the location of the selected sigma buffer sample. In an embodiment, the transparency or opacity of the enlarged object is used to determine a threshold value. The threshold value corresponds to the probability of the enlarged object being opaque at a sigma buffer sample location. In one implementation, each sigma buffer sample is assigned a random number. Step 415 compares the threshold value of the enlarged object with the selected sigma buffer sample's assigned random number. If the sigma buffer sample's random number is less than or equal to the threshold value of the enlarged object, then the enlarged object is opaque at that sigma buffer sample location and method 400 proceeds to step 420. Otherwise, the enlarged object is transparent and method 400 proceeds back to step 410.

For example, sigma buffer samples can be assigned random numbers between 0 and 1. An enlarged object with an opacity of 25% would have a threshold value of 0.25. This ensures that the enlarged object is opaque for approximately 25% of the sigma buffer samples.

If the enlarged object is transparent at the selected sigma buffer sample location, processing is complete for the sigma buffer sample for the selected object. Method 400 may return to step 410 to select another unprocessed sigma buffer sample, or, if all of the sigma buffer samples have been evaluated for the selected object, method 400 may proceeds to step 440 to select another small object, if any.

If the enlarged object is opaque at the selected sigma buffer sample location, step 420 determines whether the enlarged object intersects the sigma buffer sample. In an embodiment, this can be determined using rasterization and/or intersection techniques known in the art.

If the enlarged object does not intersect the selected sigma buffer sample location, processing is complete for the sigma buffer sample for the selected object. Method 400 may return to step 410 to select another unprocessed sigma buffer sample, or, if all of the sigma buffer samples have been evaluated for the selected object, method 400 may proceeds to step 440 to select another small object, if any.

If the enlarged object does intersect the selected sigma buffer sample location, step 425 determines if the depth of the enlarged object at the location of the sigma buffer sample is in front of the previously stored depth value of the sigma buffer sample, if any. If the enlarged object is in front of the previously stored depth value of the sigma buffer sample, then step 430 stores the color and depth of the enlarged object in the selected sigma buffer sample. Otherwise, processing is complete for the sigma buffer sample for the selected object.

Following step 435 or step 425, method 400 may return to step 410 to select another unprocessed sigma buffer sample, or, if all of the sigma buffer samples have been evaluated for the selected object, method 400 may proceeds to step 440 to select another small object, if any.

In an embodiment, method 400 repeats this evaluation for all sigma buffer samples and all small objects intersecting the sample region associated with the sigma buffer. After all of the small objects intersecting the image sample point have been evaluated, step 450 determines an average color of the sigma buffer by averaging the color values stored in the sigma buffer samples. Step 450 determines an average transparency or opacity value for the entire sigma buffer from the proportion of sigma buffer samples with color values to sigma buffer samples that are empty. Similarly, an embodiment of step 450 may determine an average depth value by averaging the depth values stored in the sigma buffer samples. In another embodiment, step 450 determines a depth range from the depth values stored in the sigma buffer samples.

The aggregate values of the sigma buffer are then combined with any other objects' contributions to the image sample point. This can be done through depth testing and/or compositing operations of the aggregate sigma buffer values (color, depth, and transparency) with the other objects contributing to the image sample point. In an embodiment, the aggregate values of the sigma buffer, determined from one or typically many small objects, is rendered as a single object intersecting one or more image sample points in a sample region, similar to the rendering of large objects.

In a further embodiment, method 400 may also be applied to transparent objects, which are any objects with less than 100% opacity, regardless of their size. In this embodiment, step 403 selects objects that are either small and/or transparent. If the selected object is a small object, then step 405 enlarges the small object and reduces its opacity proportionally. If the selected object is not a small object, then step 405 may be omitted for the selected object.

Figure 5:
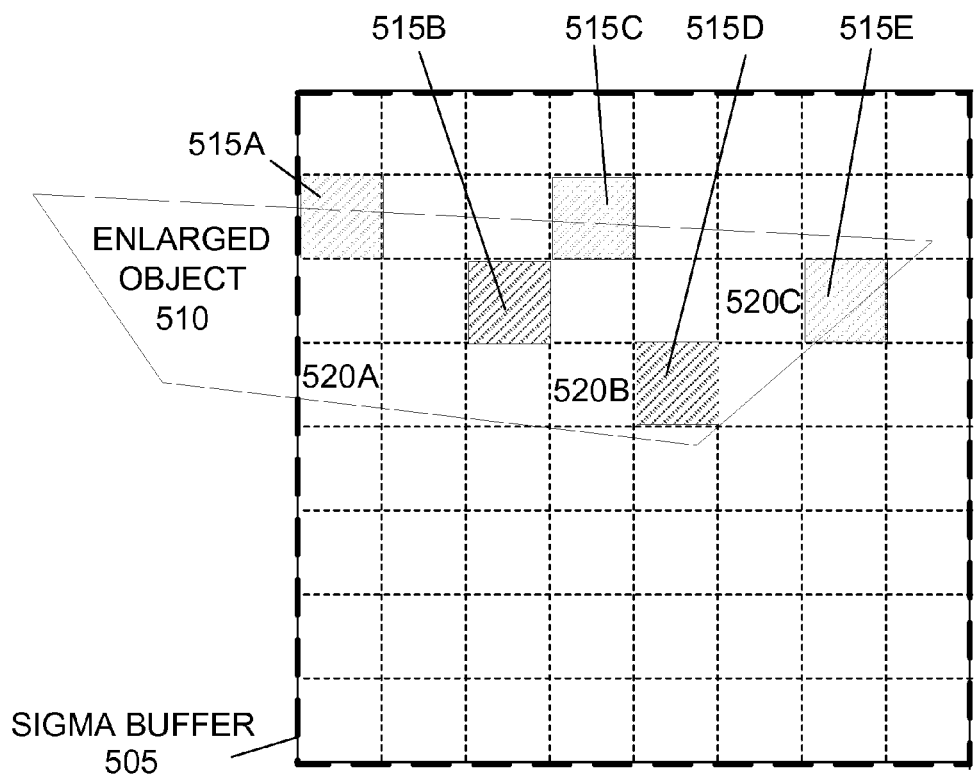
FIG. 5 illustrates an example application of a method of rendering small objects using a sigma buffer according to an embodiment of the invention.

FIG. 5 illustrates an example application 500 of a method of rendering small objects using a sigma buffer 505 according to an embodiment of the invention. In this example, an enlarged version 510 of a small object partially intersects a sample region and its associated sigma buffer 505. In this example, the enlarged object 510 has an opacity of 25%. Thus, approximately 25% of the sigma buffer samples intersecting this object are opaque, as indicated by the shading in FIG. 5. For example, sigma buffer samples 515a-515e are set as opaque. The enlarged object 510 is completely transparent over the remaining sigma buffer samples, including sigma buffer samples 520a-520c and does not contribute any color or depth values.

Figure 6A:
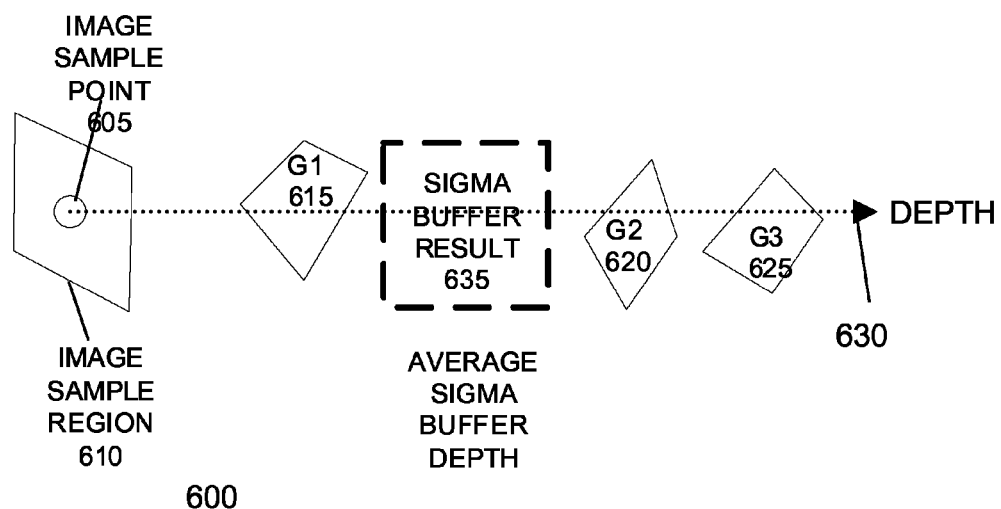
FIGS. 6A-6B illustrates methods of combining the aggregate values of the sigma buffer with other objects' contributions to an image sample point according to embodiments of the invention.
Figure 6B:
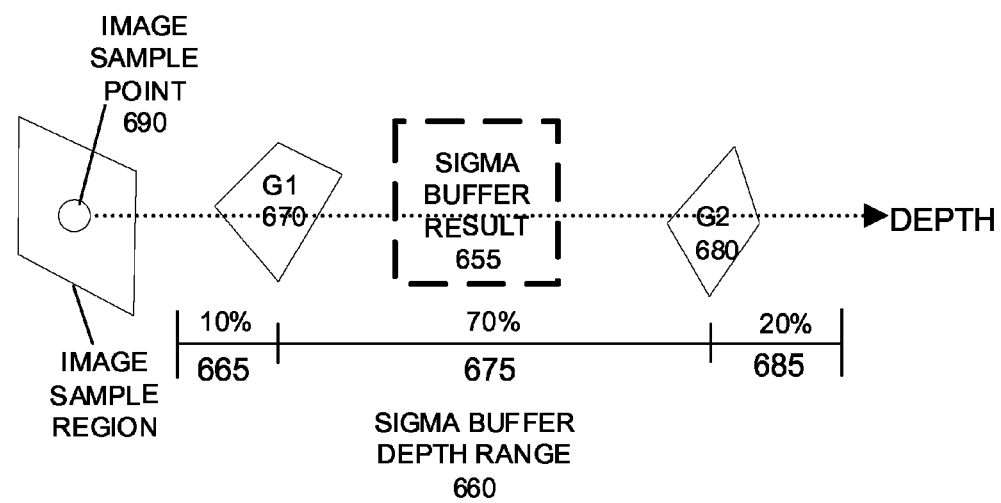

FIGS. 6A and 6B illustrates two methods of combining the aggregate values of the sigma buffer with other objects' contributions to an image sample point. FIG. 6A illustrates an image sample point in a sample region of an image plane. During rendering, objects in the scene are often divided into geometry samples, such as such as particles, polygons, micropolygons, or fragments. Based on the camera viewpoint, the renderer identifies geometry samples intersecting the line of sight of each image sample point. The intersection of geometry samples between the line of sight of each image sample point can be determined by projecting geometry samples into the image plane, by projecting rays from image sample points, or any other rendering technique known in the art. Depending on their transparency and depth order, none, some, or all of the geometry samples intersecting the line of sight of an image sample point may be visible and contribute to the value of the image sample point.

In example 600 of FIG. 6A, there are three geometry samples, G1 615, G2 620, and G3 625, intersecting the line of sight 630 associated with the image sample point 615 in sample region 610. In an embodiment, the aggregate values 635, such as color or transparency, of the sigma buffer for one or more small objects is added to the set of potentially visible geometry samples associated with an image sample point 605. In this embodiment, the sigma buffer aggregate result 635 is assigned a depth position relative to the other geometry samples based on the average depth value determined for the sigma buffer. For example, if the average depth of the sigma buffer is greater than the depth of geometry sample G1 615 and less than the depths of geometry samples G2 620 and G3 625, then the sigma buffer aggregate result 635 will be positioned behind geometry sample G1 615 and in front of geometry samples G2 620 and G3 625. The depth position of the sigma buffer aggregate result 635 can be its average depth or any other depth value that preserves the relative ordering of geometry samples and the sigma buffer.

After the sigma buffer aggregate result 635 has been positioned relative to any geometry samples associated with an image sample point, the renderer composites the attribute values of the geometry samples and the aggregate values of the sigma buffer 635. In an embodiment, the renderer treats the sigma buffer aggregate values 635 in the same manner as attribute values of any other geometry sample. In further examples, two or more sigma buffers aggregate results can be potentially visible to an image sample point 605.

FIG. 6B illustrates an example 650 of a second method of combining the aggregate values of the sigma buffer with other objects' contributions to an image sample point. In this example, the sigma buffer aggregate results 655 is associated with a depth range 660, which can be the minimum and maximum depth values of the small objects rendered into the sigma buffer or any other representation of the distribution of depth values in the sigma buffer.

In this embodiment, geometry samples that fall within the depth range partition the depth range. In this example, the depth range 660 of the sigma buffer is partitioned by the geometry samples into a first subrange 665 in front of geometry sample G1 670, a second subrange 675 between geometry samples G1 670 and G2 680, and a third subrange 685 behind geometry sample G2 680.

To composite the attribute values of the geometry samples 670 and 680 and the aggregate values 655 of the sigma buffer, the renderer treats each subrange associated with the sigma buffer as a separate geometry sample. For each subrange, the renderer weights aggregate attribute values 655, such as the aggregate color and transparency of the sigma buffer, by the size of the subrange relative to the entire depth range. For example, the first subrange 665 represents 10% of the total depth range 660, so the renderer will weight the sigma buffer aggregate attribute values 655 by 0.10 to determine the contribution of the first subrange 665 to the image sample point. Similarly, the renderer will weight the sigma buffer aggregate attribute values 655 by 0.70 and 0.20 to determine the contribution of the second 675 and third 685 subranges, respectively, to the image sample point 690.

It should be noted that the sigma buffer aggregate results, as shown in FIG. 6A, or subranges of the sigma buffer, as shown in FIG. 6B may have an average depth value or a depth range located behind opaque geometry samples. In these situations, the sigma buffer or a subrange thereof may have no contribution to the value of the image sample point.

Figure 7:
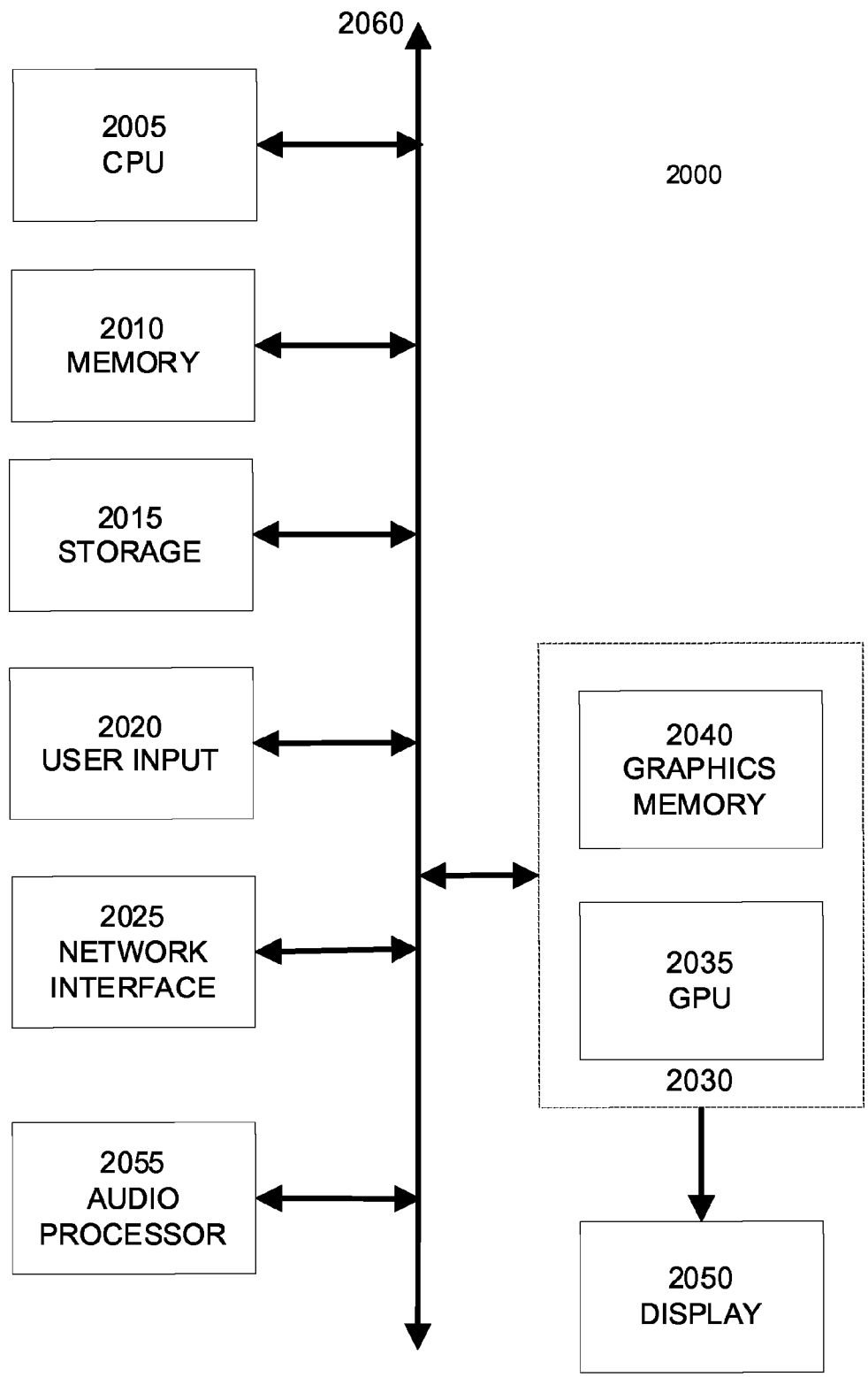
FIG. 7 illustrates a computer system suitable for implementing an embodiment of the invention.

FIG. 7 illustrates a computer system suitable for implementing an embodiment of the invention. FIG. 7 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of rendering objects, wherein objects are represented by electronically readable data structures and rendering generates pixel arrays representing images of the objects according to the data structures using a computer to perform computations of rendering, the method comprising:

defining a sample region, wherein the sample region is associated with an image sampling rate associated with a distribution of at least one image sample point within the sample region;

selecting at least one object intersecting the sample region, wherein the selected object includes an opacity value;

classifying the selected object as being a small object based on whether a size test is met the size test using the image sampling rate as an input;

in response to the determination that the selected object is not in the class of small objects, sampling the selected object using the distribution of image sample points within the sample region; and in response to the determination that the selected object is in the class of small objects:
   a) enlarging the selected object such that the enlarged object would not be in the class of small objects;
   b) assigning an opacity value to the enlarged object based on the opacity value of the selected object and based on an amount of enlargement of the selected object; and
   c) defining a set of additional samples within the sample region having a sampling rate larger than the image sampling rate; and sampling the enlarged object with the set of additional samples.

2. The method of claim 1, wherein the opacity value of the enlarged object is equal to the opacity value of the selected objected scaled by the ratio.

3. The method of claim 1, wherein the enlarged object is assigned an opacity value such that the integral of the enlarged object over the sample region is equal to the integral of the selected object over the sample region.

4. The method of claim 1, wherein classifying the selected object comprises comparing a size at least one dimension of the selected object with a size threshold.

5. The method of claim 1, wherein classifying the selected object comprises comparing an area of the selected object with an area threshold.

6. The method of claim 1, wherein classifying the selected object comprises comparing a bounding box of the selected object with a size criteria.

7. The method of claim 1, wherein classifying the selected object comprises comparing a spacing between image sample points with the selected object.

8. The method of claim 1, wherein the opacity value of the selected object is completely opaque.

9. The method of claim 1, wherein the opacity value of the selected object is partially opaque.

10. The method of claim 1, wherein sampling the enlarged object comprises:

determining at least a subset of the set of additional samples intersecting the enlarged object;

for each of the subset of additional samples, specifying a corresponding portion of the enlarged object as either completely transparent or completely opaque based on the opacity value of the enlarged object; and for each of the subset of additional samples corresponding with a completely opaque portion of the enlarged object, sampling the corresponding portion of the enlarged object to determine at least one attribute value of the additional sample.

11. The method of claim 10, wherein the ratio of completely transparent additional samples to completely opaque additional samples corresponds with the opacity value of the enlarged object.

12. The method of claim 10, wherein sampling the corresponding portion of the enlarged object comprises:
sampling the corresponding portion of the enlarged object to determine a depth value of the corresponding portion of the enlarged object and at least one additional attribute of the enlarged object;
comparing the depth value of the corresponding portion of the enlarged object with a depth value of the additional sample; and
setting at attribute value of the additional sample based on the additional attribute of the enlarged object in response to the depth value of the corresponding portion of the enlarged object being closer to a viewpoint than the depth value of the additional sample.

13. The method of claim 1, wherein the sample region is a pixel.

14. The method of claim 1, wherein the sample region is a sub-pixel size region within a pixel.

15. The method of claim 1, wherein the distribution of image sample points is stochastic.

16. The method of claim 15, wherein the set of additional samples has a stochastic distribution.

17. The method of claim 15, wherein the set of additional samples has a regular distribution.

18. A method of rendering objects, wherein objects are represented by electronically readable data structures and rendering generates pixel arrays representing images of the objects according to the data structures using a computer to perform computations of rendering, the method comprising:
defining a sample region, wherein the sample region is associated with an image sampling rate specifying a distribution of image sample points within the sample region;
selecting at least first and second objects intersecting the sample region;
sampling the first object using the distribution of image sample points within the sample region to determine attribute values of at least a portion of the image sample points;
enlarging the second object such that the enlarged object has a size at least sufficient to satisfy a predetermined size test that compares the size to the image sampling rate;
assigning an opacity value to the enlarged object based on an amount of enlargement of the second object and an opacity value of the second object;
defining a set of additional samples within the sample region having a sampling rate larger than the image sampling rate; and
sampling the enlarged object with the set of additional samples to determine attribute values of at least a portion of the set of additional samples.

19. The method of claim 18, comprising:
determining at least one aggregate value of the set of additional samples from the attribute values of the set of additional samples; and
determining at least one attribute value of the sample region based on the aggregate value and the attribute values of the image sample points.

20. The method of claim 18, wherein the opacity value of the enlarged object is equal to the opacity value of the selected objected scaled by the inverse of the scaling factor.

21. The method of claim 18, wherein the enlarged object is assigned an opacity value such that the integral of the enlarged object over the sample region is equal to the integral of the selected object over the sample region.

22. The method of claim 18, wherein the opacity value of the second object is completely opaque.

23. The method of claim 18, wherein the opacity value of the second object is partially opaque.

24. The method of claim 18, wherein sampling the enlarged object comprises:
determining at least a subset of the set of additional samples intersecting the enlarged object;
for each of the subset of additional samples, specifying a corresponding portion of the enlarged object as either completely transparent or completely opaque based on the opacity value of the enlarged object; and
for each of the subset of additional samples corresponding with a completely opaque portion of the enlarged object, sampling the corresponding portion of the enlarged object to determine at least one attribute value of the additional sample.

25. The method of claim 24, wherein the ratio of completely transparent additional samples to completely opaque additional samples corresponds with the opacity value of the enlarged object.

26. The method of claim 24, wherein sampling the corresponding portion of the enlarged object comprises:
sampling the corresponding portion of the enlarged object to determine a depth value of the corresponding portion of the enlarged object and at least one additional attribute of the enlarged object;
comparing the depth value of the corresponding portion of the enlarged object with a depth value of the additional sample; and
setting at attribute value of the additional sample based on the additional attribute of the enlarged object in response to the depth value of the corresponding portion of the enlarged object being closer to a viewpoint than the depth value of the additional sample.

27. The method of claim 18, wherein the sample region is a pixel.

28. The method of claim 18, wherein the sample region is a sub-pixel size region within a pixel.

29. The method of claim 18, wherein the distribution of image sample points is stochastic.

30. The method of claim 29, wherein the set of additional samples has a stochastic distribution.

31. The method of claim 29, wherein the set of additional samples has a regular distribution.

32. A method of rendering objects, wherein objects are represented by electronically readable data structures and rendering generates pixel arrays representing images of the objects according to the data structures using a computer to perform computations of rendering, the method comprising:
defining a sample region, wherein the sample region is associated with an image sampling rate specifying a distribution of image sample points within the sample region;
selecting at least one object intersecting the sample region, wherein the selected object includes an opacity value;
determining if the selected object should be sampled at a sampling rate greater than the image sampling rate based on an attribute of the selected object;
in response to the determination that the selected object should not be sampled at a sampling rate greater than the image sampling rate, sampling the selected object using the distribution of image sample points within the sample region; and in response to the determination that the selected object should be sampled at a sampling rate greater than the image sampling rate:
- a) defining a set of additional samples within the sample region, wherein the additional samples have a sampling rate greater than the image sampling rate;
- b) determining at least a subset of the set of additional samples intersecting the selected object;
- c) for each of the subset of additional samples, specifying a corresponding portion of the selected object as either completely transparent or completely opaque based on the opacity value of the selected object; and
- d) for each of the subset of additional samples corresponding with a completely opaque portion of the selected object, sampling the corresponding portion of the selected object to determine at least one attribute value of the additional sample.

33. The method of claim 32, wherein determining if the selected object should be sampled at the sampling rate greater than the image sampling rate comprises:
determining if the selected object is partially transparent.

34. The method of claim 32, wherein determining if the selected object should be sampled at the sampling rate greater than the image sampling rate comprises:
determining if the selected object has a size relative to the image sampling rate that meets a predetermined size test.

35. The method of claim 32, wherein determining if the selected object should be sampled at the sampling rate greater than the image sampling rate comprises:
determining if the selected object includes a user-specified attribute specifying that the selected object should be sampled at the sampling rate greater than the image sampling rate.

36. The method of claim 34, wherein in response to the determination that the selected object has a size that meets the predetermined size test, the method further comprising:
enlarging the selected object such that the selected object no longer meets the predetermined size test;
assigning an opacity value to the enlarged object based on an amount of enlargement of the selected object and an opacity value of the selected object; and
using the enlarged object as the selected object for the steps of determining at least a subset of the set of additional samples intersecting the selected object; specifying a corresponding portion of the selected object as either completely transparent or completely opaque based on the opacity value of the selected object; and sampling the corresponding portion of the selected object.

37. The method of claim 32, wherein the sample region is a pixel.

38. The method of claim 32, wherein the sample region is a sub-pixel size region within a pixel.

39. The method of claim 32, wherein the distribution of image sample points is stochastic.

40. The method of claim 39, wherein the set of additional samples has a stochastic distribution.

41. The method of claim 39, wherein the set of additional samples has a regular distribution.

* * * * *